INVENTOR.
EDWARD J. BOJAS

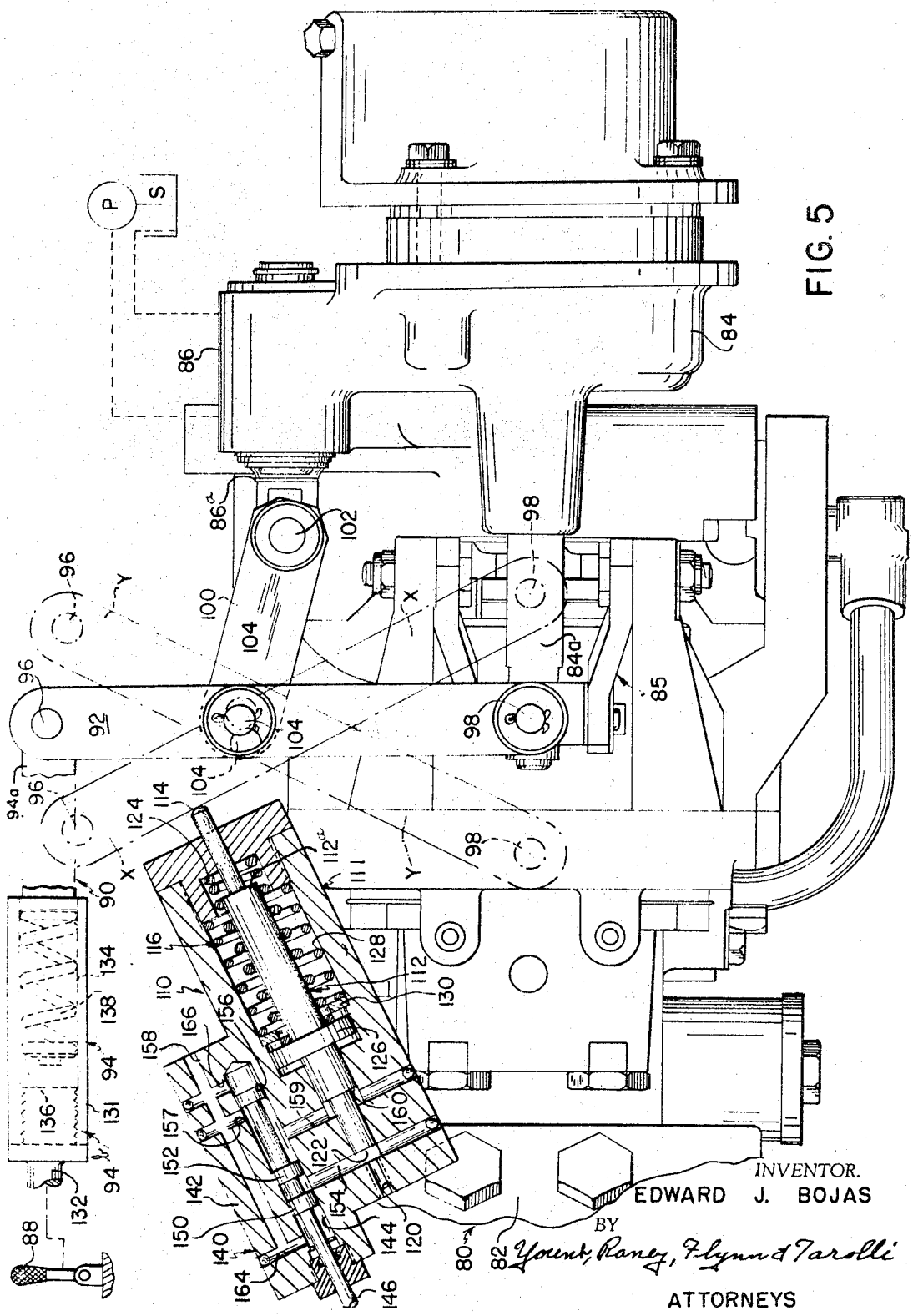

United States Patent Office
3,448,578
Patented June 10, 1969

3,448,578
POWER LIMITER CONTROL
Edward J. Bojas, Royal Oak, Mich., assignor to Eaton Yale & Towne Inc., Cleveland, Ohio, a corporation of Ohio
Filed June 12, 1967, Ser. No. 645,194
Int. Cl. F16d 33/04
U.S. Cl. 60—53                                13 Claims

ABSTRACT OF THE DISCLOSURE

The power limiter control includes a piston and cylinder-type servo motor which is arranged to act on the actuating linkage for a hydrostatic transmission to reduce the drive therethrough. The motor is operated by fluid pressure from the transmission and move the piston rod outwardly of the cylinder when the established drive ratio of the transmission becomes unsatisfactory due to development of a condition of operation to compensate for the condition. Outward movement of the piston rod into engagement with the actuating linkage effects movement of the linkage to reduce the drive ratio of the transmission by changing the relative angular position of a tiltable head pump and hydraulically connected tiltable head motor of the transmission.

---

The present invention relates to hydrostatic transmissions and particularly to controlling the power transmitted by hydrostatic transmissions.

Known hydrostatic transmissions include a tiltable head pump unit and a tiltable head motor unit hydraulically interconnected. The pump unit is driven by a drive shaft, for example, the drive shaft of an engine, and transmits fluid under pressure to the motor unit. The motor unit is driven by the fluid under pressure and drives an output shaft which may, for example, be connected to the back wheels of a tractor. The power and speed relationship of the transmission can be regulated by controlling the drive ratio of the transmission. A particular drive ratio can be established by changing the relative positions of the tiltable heads in accordance with known practices.

Hydrostatic transmissions are designed for a specified maximum power input thereto. When so used, the power or torque generated by the motor unit is within safe limits so that the parts of the transmission are not overstressed when the maximum drive ratio is established between the tiltable heads of the units. However, in certain applications, the transmissions are driven by an engine or motor which is capable of delivering power which exceeds the power input capacity of the transmission. To protect the transmission, it is necessary to control the transmission so that the parts of the transmission will not be overstressed.

Accordingly, it is an important object of the present invention to provide a new and improved hydrostatic transmission in which means is provided to control the relative positions of the tiltable heads of the pump and motor units to thereby control the drive ratio therebetween so that the power transmitted is within power limits designed for the transmission.

A further object of the present invention is the provision of a new and improved hydrostatic transmission as noted in the next preceding paragraph wherein the drive ratio is controlled in response to the fluid pressure of the transmission.

Another object of the present invention is the provision of a new and improved hydrostatic transmission in which the drive ratio between the pump and motor units is varied by a linkage arrangement which changes the relative positions of the tiltable heads of the pump and motor units and an overriding control device is operable to change the drive ratio established by the linkage when the established drive ratio would provide an excessive power output.

Another object of the present invention is the provision of a new and improved hyrosatic transmission having control means including a fluid pressure responsive member biased out of engagement with the actuating linkage for effecting movement of the pump and motor units and movable into engagement with the linkage to shift the linkage and change the relative positions of the pump and motor units when the fluid pressure of the transmission overcomes the bias of the pressure responsive member.

Yet another object of the present invention is the provision of a new and improved hydrostatic transmission, as noted in the preceding paragraph, wherein reciprocable power means operates the actuating linkage and is connected thereto so that the fluid pressure responsive member can shift the actuating linkage without moving the reciprocable power means.

A still further object of the present invention is the provision of a new and improved mechanism for controlling the drive ratio of a hydraulic transmission and which provides for changing the relative positions of the tiltable head units of the pump and motor to provide a lower drive ratio in the event that the engine driving the transmission is approaching a stall condition to prevent engine stall-out.

A still further object of the present invention is the provision of a new and improved mechanism or controlling the power output of a hydraulic transmission as noted in the next preceding paragraph wherein the anti-stall mechanism comprises a valve which is operable in response to a condition approaching stall of the engine to increase the force exerted by the fluid pressure on a piston rod so that the piston rod moves out of its cylinder and into engagement with the actuating linkage for effecting a change in the position of the pump and motor units to provide a lower drive ratio.

Further objects and advantages of the present invention will be apparent to those skilled in the art to which it relates from the following detailed description of preferred embodiments thereof made with reference to the accompanying drawings forming a part of this specification and wherein:

FIG. 4 is a view showing part of the transmission of FIG. 2; and

FIG. 5 is a fragmentary elevational view of another embodiment of the present invention.

The present invention provides a relatively simple and effective means for controlling the power transmitted by a hydrostatic transmission. In the illustrated embodiment, the control is provided by a fluid pressure responsive member which provides a safe drive ratio between the pump and motor of the hydrostatic transmission by changing the relative positions of the pump and motor. The pressure responsive member is controlled by the fluid pressure output of the pump.

Figure 1:
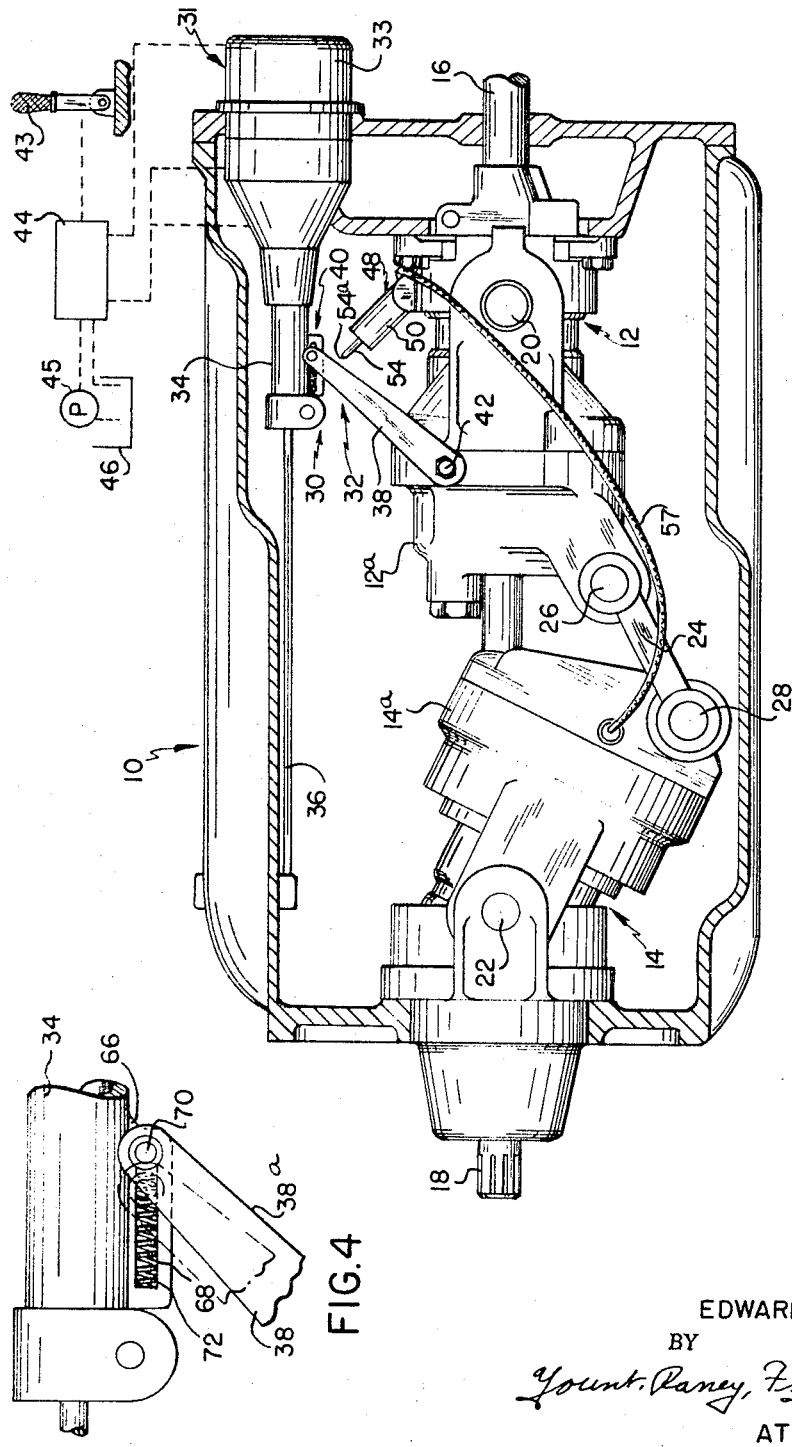
FIG. 1 is an elevational sectional view of a transmission embodying the present invention.

The invention is preferably embodied in a hydrostatic transmission mechanism 10, shown in FIG. 1. The transmission 10 includes a pump 12 which is hydraulically connected to drive a motor 14. The pump 12 is driven by a motor or engine, such as an engine of a tractor or other vehicle. The drive from the engine is transmitted to the pump through a drive shaft 16. The drive shaft 16 drives the pump which delivers fluid under pressure to drive the motor 14. The motor 14 is drivingly connected to an output shaft 18, which may, for example, be connected to the rear drive axle of a vehicle, such as a tractor.

The pump 12 and motor 14 each have tiltable heads 12a and 14a, respectively, which are supported for pivotal movement about the axis of pins 20 and 22, respectively. The pump 12 and motor 14 are mechanically and hydraulically interconnected by a pair of links 24. Each link 24 is pivotally connected at its ends to pins 26 and 28 carried by the tiltable heads 12a and 14a, respectively.

The pump 12 and motor 14 are similar in construction and will not be described herein in detail since they do not per se form a part of the present invention. Reference may be made to United States Patents to Thoma, No. 3,143,859 and to Thoma et al, No. 3,142,964 for details of construction and operation of the pump 12 and motor 14. For purposes of the present invention, a brief description of the construction and operation of the pump and motor will suffice. The pump and motor each have an axially fixed rotary member or drive flange. The drive flange of pump 12 is driven by input drive shaft 16 and the drive flange of the motor 14 is drivingly connected to output shaft 18 to transmit drive thereto. The tiltable pump and motor heads 12a and 14a are mounted for tilting or pivotal movement relative to their drive flanges and each includes a housing containing a rotary cylinder block, a rotary drive means between the drive flange and the cylinder block, and pistons arranged for reciprocation in the cylinder of the cylinder block.

The tilt angle of the heads 12a and 14a, i.e., the angle formed by the intersection of the axis of rotation of the cylinder block with the axis of rotation of the drive flange, determines the effective stroke of the pistons in their cylinders and the ratio of the displacement of the pump head 12a relative to the displacement of the motor head 14a, determines the speed and torque transmitted.

The pump and motor are tilted simultaneously into different relative angular positions by an actuating means 30 to provide different power and speed relationships for the transmission. The actuator 30 comprises a fluid motor 31 and linkage means 32 connecting the pump head 12a and the fluid motor 31. The actuator 30 operates to pivot pump head 12a about the axis of pin 20 and produces a corresponding pivoting of motor head 14a about the axis of pin 22 through links 24. The motor 31 comprises a cylinder 33 mounted in the housing of the transmission and a piston rod 34. The piston rod 34 slides along a rod 36 supported on the housing during movement and is connected at its underside to linkage means 32. Linkage means 32 includes a lever 38 pivotally connected at its upper end to the piston rod 34 by a connecting means 40, and is pivotally connected at its lower end to the housing of pump head 12a by a pin 42.

The "neutral" position of the transmission is shown by the relative positions of the pump head 12a and motor head 14a in FIG. 1. In the "neutral" position, the tiltable pump head 12a and in particular, the axis of rotation of the cylinder block therein, is coaxial with the axis of drive shaft 16 and there is no pump tilt angle. When the pump head 12a is in its "neutral" position, the links 24 position motor head 14a in its position of maximum displacement. It is assumed for purposes of illustration only that upward movement of pump head 12a from its "neutral" position causes motor 14 to drive shaft 18 in a direction of rotation which will propel the vehicle in a forward direction and downward movement provides for reverse movement of the vehicle. To propel the vehicle forward, the operator moves a hand lever 43 which is conveniently located at the operator's station of the vehicle. The lever 43 is operatively connected to a suitable valve such as a spool valve which controls the flow of fluid from a pump 45 to one side of the piston of the hydraulic actuator motor 31 and the return of fluid from the other side of the piston to a sump 46 in fluid communication with pump 45.

The lever 43 when moved in one direction effects operation of actuator 30 to cause upward movement of the tiltable pump head 12a which moves the head 12a out of zero angular displacement with respect to the axis of the pump drive flange and shaft 16 and causes the pistons to reciprocate within the pump cylinder block. Piston movement within the cylinder block directs fluid under pressure to the motor head 14a through the fluid passageway in one of the links 24. The upward movement of the pump head 12a also produces a corresponding upward movement of the motor head 14a about the axis of pin 22 toward its "neutral" position, thereby reducing the displacement angle of motor head 14a.

The vehicle can be propelled in the reverse direction by moving lever 43 in the opposite direction which effects operation of actuator 30 to move the pump head 12a downward from its "neutral" position. It should be apparent that as the displacement angle of pump head 12a increases, the displacement angle of motor head 14a decreases and vice versa. By changing the relative angular positions between the tiltable heads 12a and 14a, the power and speed relationships between the pump and motor can be varied by changing the drive ratio of the transmission. The drive ratio increases as the displacement of pump 12 increases and motor 14 decreases and the drive ratio decreases as the displacement of pump 12 decreases and motor 14 increases.

Transmissions of the type described herein are designed for a specific maximum power input and when power inputs in excess of the maximum are applied to the transmission, the parts of the transmission are overstressed and may become damaged. There are certain situations where the transmission is driven by a vehicle engine or the like which is capable of delivering input power to the transmission in excess of the maximum specific input power for which it is designed.

The present invention provides means for controlling the transmission to prevent overstressing of the parts of the transmission. In the embodiment illustrated in FIGS. 1–4, the control means includes a fluid pressure responsive means 48 which operates as an overriding control to change the established drive ratio to a lower drive ratio when the established drive ratio for a given power input would be excessive. The fluid pressure responsive means 48 includes a cylinder 50 supported in any suitable manner, such as on the housing of the fixed part of the pump, and a piston rod 54. Preferably, the piston rod 54 has a rounded nose portion 54a which is arranged to engage an edge 38a of the lever 38 and shift the lever into a different operative position. The piston rod 54 is normally biased away from lever 38 by a suitable preloaded spring 56. Alternately, a series of springs may be used to provide a variable rate to more closely approximate the constant horsepower curve. Spring 56 is arranged in cylinder 50 to act between one end of cylinder 50 and one side of the piston and move the piston and piston rod toward the other end of the cylinder. Piston rod 54 is moved in the opposite direction toward lever 38 by the fluid pressure output of pump 12. The fluid pressure for operating motor 48 is directed from a cavity in the motor block to the cylinder 50 through a flexible conduit 57 and passageway 58 in cylinder 50.

Figure 2:
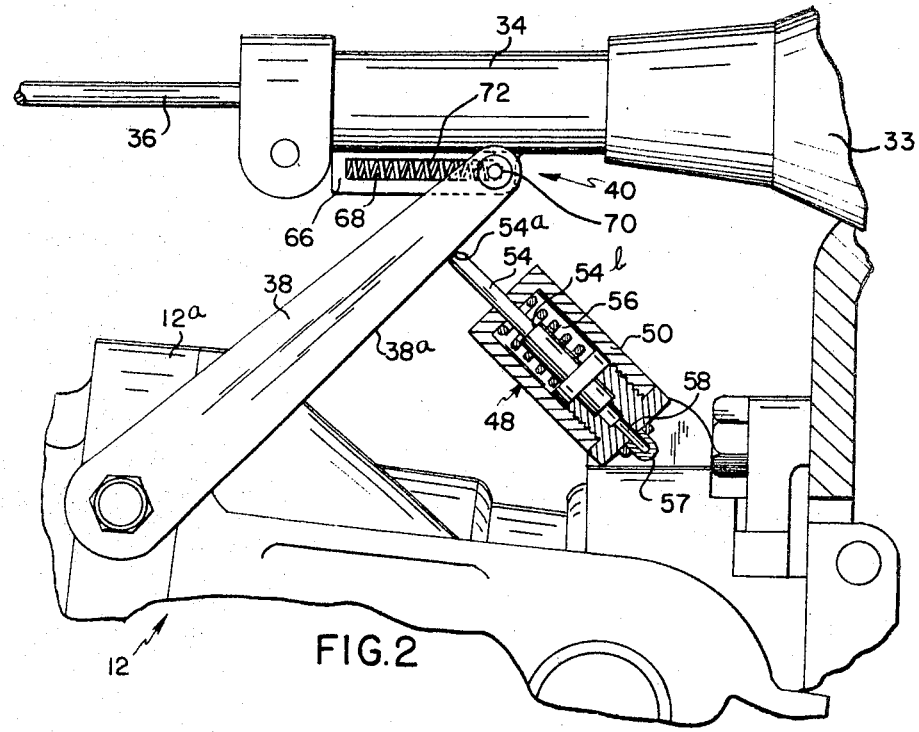
FIG. 2 is a view showing part of the transmission of FIG. 1 on a larger scale.
Figure 3:
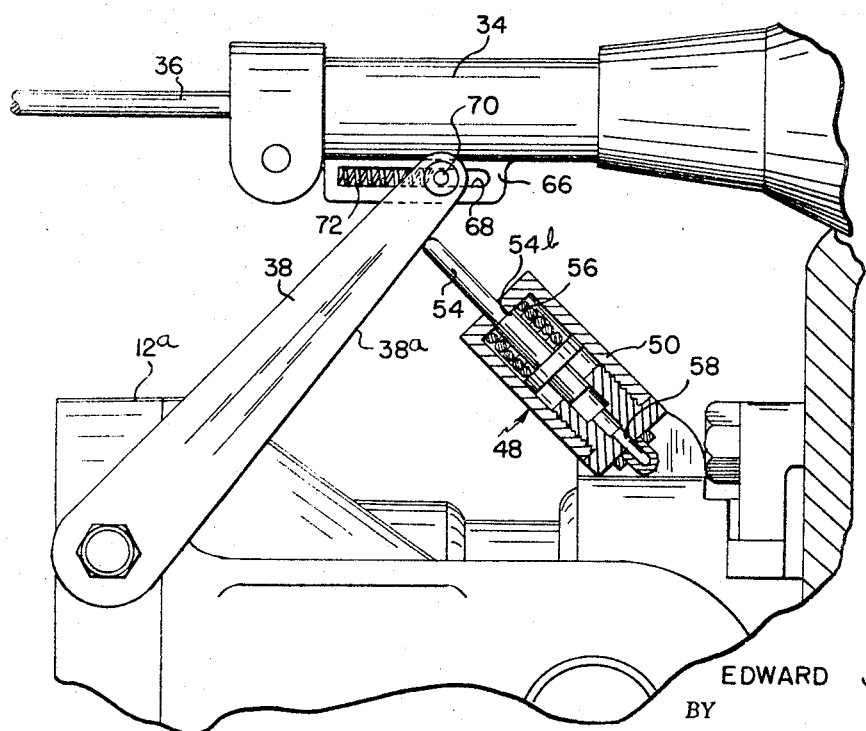
FIG. 3 is a view similar to FIG. 2 and showing the parts in different positions.

During operation at low power inputs to the transmission, the fluid pressure in the motor block directed into the cylinder 50 by conduit 57 is insufficient to overcome the force of spring 56. As a result, piston rod 54 is maintained out of engagement with the lever 38, as illustrated in FIG. 2, and the operator setting of lever 43 controls the drive ratio of the transmission. As the power delivered to pump 12 by shaft 16 increases, the fluid pressure output of the pump 12 increases. At a predetermined power input, this pressure overcomes the force of spring 56 and moves piston rod 54 outwardly of the cylinder 50 into engagement with the edge 38a of the lever 38. The movement of the piston rod 54 is sufficient to shift the lever 38 counterclockwise, as view in the drawings, thereby moving the pump head 12a downwardly from a position such as illustrated in FIG. 2 to a position such as illustrated in FIG. 3. Downward movement of the pump head from its position illustrated in FIG. 2 toward the pump "neutral" position illustrated in FIG. 1 causes a corresponding movement of the motor head and increases the pressure output of pump 12 while reducing the drive ratio of the transmission. This increase in pressure is communicated to the cylinder 50 and causes the piston rod 54 to continue to move until it is stopped when the stepped portion 54b of the rod 54 engages the end wall of the cylinder 50 as shown in FIG. 3. The piston rod 54 thus establishes a drive ratio which will protect the transmission from being overstressed when the power input to the transmission exceeds the maximum designed input capacity of the transmission.

The piston rod 54 maintains engagement with the lever 38 and prevents movement of the lever 38 by actuator 30 into a position which would establish a higher drive ratio until the power input to the pump 12 is reduced. Reduction of the input power to a safe level reduces the fluid pressure output of the pump and permits the spring 56 to move the piston 54 out of engagement with the lever 38. The preloading of spring 56 determines the fluid pressure at which the piston rod 54 begins to move and the extent to which the piston rod 54 shifts the lever 38 is determined by the rate of the spring and length of travel set by location of stepped portion 54b along piston rod 54. Hence, the pressure at which the control means 48 operates and the drive ratio established by moving the lever 38 can be set by the selection of spring 56 and the length of travel of piston rod 54. Restrictors may be provided for control means 48 to smooth out system pressure fluctuation to prevent rapid changes in vehicle acceleration or deceleration.

The connector means 40, which connects the lever 38 to the piston rod 34 of actuator means 30, permits the control means 48 to shift lever 38 relative to piston rod 34 so that the control means 48 does not move the piston rod 34 relative to cylinder 33. The connector means 40 can be generally described as a spring block arrangement and includes a pair of plates 66 depending from the underside of piston rod 34. Plates 66 have horizontally aligned elongated openings 68 which receive a pin 70 and support the pin 70 for sliding movement therein. The end of lever 38 is connected to pin 70 and can pivot relative to the piston rod 34. The pin 70 is biased toward the righthand end of the openings 68 by a preloaded spring 72. Movement of lever 38 by control means 48 moves pin 70 along openings 68 and against the bias of spring 72. After the control means 48 has established a safe drive ratio and the pressure in the motor cavity drops to a predetermined pressure, the spring 56 operates to move the piston rod 54 out of engagement with the lever 38. With the piston rod 54 so positioned, the spring 72 returns lever 38 to the position established by fluid motor 31 before operation of control means 48 and the actuator 30 can then be operated to change the drive ratio, if desired.

The power limiter control described heretofore has application in hydraulic transmissions of different constructions but which perform essentially the same function as the transmission 10 shown in FIGS. 1 to 4 of the drawings. One such other construction is shown in FIG. 5 which illustrates a hydraulic transmission 80. The hydraulic transmission 80 functionally operates substantially the same as the hydraulic transmission 10 disclosed in FIGS. 1 through 4. That is to say that the drive through the transmission 80 is controlled by controlling the tilt of the pump head unit 82, partially shown in FIG. 5, which in turn controls the relative position of the motor head unit not shown.

The pump head unit 82 is moved into various angular or tilt positions by a fluid motor 84. The motor 84 is connected to the pump 82 by a suitable linkage. Operation of the fluid motor 84 is controlled by a servo valve 86 which controls the application of fluid from a source of fluid under pressure such as pump P, to motor 84. The valve 86 is set to direct fluid from pump P to one or the other side of the piston of the motor 84 to move the piston and position the pump 82 and the associated motor into a selected angular position to provide a particular drive ratio through the transmission. The valve 86 is also connected to a sump to direct the fluid from the opposite side of the piston to a sump S.

The servo valve 86 may be a spool-type valve which is moved into various operational settings by an operator's control lever 88, which is conveniently located at the operator's station. To establish a particular drive ratio through the transmission 80, the operator moves lever 88 to a selected position which changes the position of the spool valve 86 through a lingage arrangement designated generally 90.

The linkage system 90 comprises a servo control arm 92. The servo control arm 92 is connected at its upper end to the hand-operated control lever 88 by an extensible link 94, which is pivoted to arm 92 by a pin 96. The lower end of control arm 92 as viewed in the drawings is pivotally connected to the free end of a piston rod 84a of motor 84 by a pin 98. The control arm 92 is pivotally connected to the protruding end of the valve spool 86a by a link 100. Link 100 is pivotably connected to the end of valve spool 86a by a pin 102 and is connected to an intermediate portion of the control arm 92 by a pin 104.

Movement of hand lever 88 to the left as viewed in FIG. 5 produces a corresponding movement to the left of control arm 92 about the axis of pin 98 which causes a leftward movement of link 100 and the valve spool 86a. The described movement of the linkage arrangement 90 positions the servo valve 86 to direct fluid to the left-hand side of the piston of the motor 84 causing the piston rod 84a to move to the right as viewed in the drawings. This movement of the piston rod 84a causes the pump 82 and associated motor to move into positions such as to establish the maximum forward drive ratio through the transmission 80.

The described initial pivoting movement of control arm 92 is counterclockwise about the axis of pin 98. As the piston rod 84a moves to the right as a result of movement of valve spool 86a by arm 92, it pivots control arm 92 counterclockwise about the axis of pin 96, and the control arm 92 will assume the dotted line position thereof indicated as X in the drawings.

As the piston rod 84a moves toward its destination position, the counterclockwise pivoting of arm 92 provides a feedback for the valve 86 to return the valve spool 86a toward its neutral position. It is apparent from FIG. 5 that as the lower end of control arm 92 pivots about the axis of pin 96 the pin 104 connecting link 100 to the control arm 92 will move to the right, thereby moving the valve spool 86a toward its neutral position. Eventually the control arm positions the valve spool 86a in its neutral position to block fluid communication between pump P and motor 84, and the transmission is then locked in the selected position of adjustment.

To set the transmission 80 into its maximum reverse drive position, lever 88 is moved clockwise about its pivot as viewed in FIG. 5 and eventually the control arm 92 is moved into the dotted line position indicated as Y in the drawings. The control arm 92 is moved into the Y position by reversing the application of fluid to fluid motor 84 so that piston rod 84a moves to the left as viewed in the drawings and positions the pump 82 and associated motor into the maximum reverse setting. The feedback arrangement operates during the reverse setting to return the valve spool 86a to its neutral position upon movement of the lower end of the control arm 92 from the full line position shown to the left or clockwise about the axis of pin 96.

The transmission 80 is controlled when it has been set in a forward drive position by a power limiter control means indicated generally as 110. The power limiter control includes a fluid cylinder 111 fixed in any suitable manner to the housing of the pump 82. A piston rod assembly 112 is moved relative to the cylinder 111 in response to application of a predetermined fluid pressure against one end thereof so that the opposite or forward portion 114 of the piston rod 112 moves outward of the cylinder 111 into engagement with control arm 92 and shifts the control arm 92 to set valve 86 to establish a lower drive ratio. Movement of piston rod 112 toward arm 92 is opposed by spring means 116 and consequently the power limiter will operate only when the fluid pressure overcomes the spring means 116.

The fluid pressure is directed into cylinder 111 through a fluid opening 120 in one end thereof. The fluid is directed to opening 120 from the cavity of the motor of transmission 80 by a suitable conduit. The fluid upon entering the passageway 120 acts against a first fluid pressure area 122 on the piston rod 112 and when the pressure in the motor cavity exceeds a predetermined safe value it will overcome the spring means 116 and establish a lower drive ratio for the transmission.

The spring means 116 comprises a first coil spring 124 which closely surrounds the piston rod 112 and acts at one end against the forward end of cylinder 111 and at the opposite end against an abutment 126 on the piston rod 112. The spring means 116 further comprises a second coil spring 128 which is concentrically arranged with respect to the piston rod 112 in cylinder 111 and abuts at one end the forward end of the cylinder 111 and at the opposite end against a washer 130 which is arranged to be engaged by the abutment 126 after the piston rod 112 has moved from its retracted position outwardly in response to the fluid pressure overcoming the effect of the spring 124. Although a single spring could be used, the use of two springs of different rates provides for more precise control of the power limiter control.

For purposes of illustration, it is assumed that the transmission 80 had been set in the maximum forward speed condition by hand lever 88 and the control arm 92 would be positioned as indicated by position X. If, when in this setting, the transmission 80 would be overstressed due to the high drive ratio provided therethrough, fluid pressure in the motor cavity would increase above a preset limit and consequently the fluid acting against the first pressure area 122 of the piston rod 112 would overcome the force of spring 124 first and then spring 128, and move the forward end of the piston rod 116 outwardly to shift the control arm 92 toward its neutral or full line position. Movement of the control arm 92 toward the full line position shown in the drawings would effect operation of valve 86 to control cylinder 84 to change the angular positions of the pump 82 and associated motor into a lower speed setting such that it would not overstress the parts of the transmission. The maximum extent to which the piston rod 112 can move the arm 92 is determined by the distance from the end 114 of piston rod 112 to an abutment 112a. Movement of piston rod 112 stops upon the abutment 112a engaging the front wall of the cylinder.

With the pump and motor set in a lower drive ratio, the pressure of the fluid in the motor cavity will reduce to a point such that the combined effect of springs 124 and 128 will overcome the fluid pressure acting against the piston rod 112 causing the piston rod 112 to retract into the cylinder 111.

Movement of the control arm 92 by the piston rod 112 does not shift the entire linkage 94 and lever 88. The link 94 as stated herebefore is an extensible type link and has a spring box mounted intermediate the end thereof which permits movement of link part 94a which is connected to control arm 92 relative to link part 94b which is connected to the hand lever 88. Link part 94b includes a sleeve member 130 which threadably receives a rod portion 132 at one end which is connected in any suitable manner to the hand lever 88. The sleeve 130 has an opening 134 which slidably receives link part 94a.

Link part 94a includes a reduced end portion terminating in an annular collar 136 providing an abutment against which one end of a coil spring 138 acts. The spring 138 surrounds the reduced portion of link part 94a and the opposite end of the spring engages a shoulder portion formed at the forward end of the sleeve 131. The spring 138 biases link part 94a toward the left or into sleeve 131 so that the piston rod 112 upon being moved outward moves the link part 94a outwardly of the sleeve 131 and relative thereto and does not disturb the setting of hand lever 88. When the transmission 80 is set into the lower drive ratio and the fluid pressure subsides such that the spring means 116 moves the piston rod 112 out of engagement with arm 92, the spring 138 returns the link part 94a to its initial position and resets the control arm 92 in the position established by the hand control lever 88.

The power limiter control 110 according to the present invention further includes an anti-stall control means for shifting the position of control arm 92 to reduce the power demand of the transmission 80 when the drive means for the transmission, such as the engine of a vehicle, is about to stall due to, for example, an excessive power demand placed thereon by various auxiliary equipment being driven thereby. In the absence of an anti-stall control, the engine would stall and interrupt the various operations being performed by the equipment associated with the vehicle.

The anti-stall control comprises valve means 140. Valve means 140 includes a valve body 142 which may be formed integral with the cylinder 111 and is so shown in FIG. 5. Valve body 142 has a main axially extending fluid passageway 144 within which a valve spool 146 operates to control flow of fluid therethrough. The spool valve 146 is operated by any suitable type of actuating mechanism such as an electrically operated solenoid connected to the end of valve spool 146. The solenoid is energized when the engine approaches a stall condition and positions the spool valve 146 in the passageway 144 to effect operation of the piston rod 112 to shift control arm 92 into a lower drive ratio to prevent engine stall. The piston rod 112 is operated under the stall condition even though the fluid pressure delivered to the cylinder 111 through passageway 120 is otherwise below the pressure necessary to move piston rod 112 during the excessive power condition described heretofore.

When the engine is near a stalled condition a suitable known sensing mechanism senses this condition and completes a circuit, for example, to the solenoid which shifts the spool valve 146 from the position shown in FIG. 5 to the left. When shifted to the left, lands 150 and 152 on the valve spool 146 are disposed to the left of a radially extending passageway 154, providing communication between passageway 144 and the passageway 120 in cylinder 111. The described movement of valve spool 146 will also dispose a land 156 thereon to the left of a radially extending passageway 157 in the valve body 142 to block flow from main passageway 144 through passageway 157 to a secondary passageway 158 in valve body 142 which is connected to sump. With the valve 140 positioned as described, fluid entering passageway 120 acts upon the first area 122 of the piston rod 112 and flows through radial passageway 154 into primary passageway 144 of valve 140. Fluid in passageway 144 is directed through another radially extending passageway 159, and acts upon a secondary area 160 on piston rod 112 formed by providing a stepped configuration of the piston rod 112 at the rear end. The increase in the area of piston rod 112 against which the fluid acts, i.e., surfaces 122 and 160 will apply sufficient force on the piston rod 112 to overcome the bias of spring means 116 and move the piston rod 112 outwardly of cylinder 111. The piston rod will engage and shift control arm 92 and establish a lower drive ratio in the transmission 80. If desired, the described movement of piston rod 112 could set the transmission 80 in its neutral or idle condition.

When the engine is out of the stall condition, the valve spool 146 is shifted into the position illustrated in FIG. 5 and the spring means 116 moves the piston rod 112 to the left and out of engagement with the control arm 92. To permit leftward movement of the piston rod 112, the fluid acting on piston rod secondary surface 160 is vented to sump through passageway 159, passageway 144, passageway 157, and common passageway 158, which is connected to sump. The fluid trapped to the left of land 150 in main passageway 144 is vented to the sump through a passageway 164 and into the common passageway 158 to sump. Likewise the fluid which is trapped to the right of land 156 as viewed in the drawings is vented to sump through a passageway 166 and into common passageway 158. It can be seen that when the engine approaches a stall condition the valve spool 146 is shifted from its position shown in FIG. 5 to the left and directs fluid against the secondary area 160 of the piston rod 112 and moves the piston rod 112 into engagement with the control arm 92. The increased area of piston rod 112 against which the pressure now acts will effect movement of the piston rod even though the pressure acting against the primary area only would not move the piston rod. Shifting the control arm 92 operates servo valve 86 which in turn controls the fluid motor 84 to set the transmission 80 into a lower drive ratio.

When the engine is out of danger of stalling, the spool valve 146 is shifted into the position shown in FIG. 5 by de-energizing the solenoid and the spring means 116 retracts the piston rods 112. With the spool valve 146 so positioned, the piston rod 112 will engage arm 92 when the fluid pressure entering passageway 120 and acting against the primary area 122 only is sufficient to overcome the biasing effect of spring means 116. This condition exists when the transmission is in an overpower condition as described heretofore. The valve spool 146 when positioned as shown in FIG. 5 blocks communication between passageways 154 and 159 due to the lands 150 and 152 blocking communication between passageway 154 and main passageway 144.

From the foregoing, it should be apparent that a relatively simple and effective power limiting control arrangement has been shown and described which is effective for limiting the power transmitted by the transmission 10 when an excessive power condition is about to develop in the transmission or the engine driving the transmission is approaching a stall condition.

Although the illustrated embodiments of the present invention have been described herein in considerable detail it is intended to cover all adaptations and modifications which come within the scope of the appended claims. For example, although the power limiter control embodiments as shown in the drawings are used to control the drive ratio of a transmission, it should be appreciated that the same can be used to control operation of just a pump unit.

Having described my invention, I claim:

1. A power transmission mechanism comprising pump means for providing fluid under pressure and having a tiltable part, motor means operated by the fluid pressure output of said pump means and having a tiltable part, means providing for fluid communication between said pump means and said motor means, the relative positions of said tiltable parts determining the drive ratio of said transmission, control means for selectively setting a predetermined relative position of said tiltable parts to provide a predetermined drive ratio, and means for changing the relative position of said tiltable parts from the setting in response to a predetermined condition of operation to limit the power transmitted by said transmission, said means for changing the relative position of said tiltable parts including a fluid motor operatively connected with said control means, and means communicating the fluid pressure of said transmission to said fluid motor to operate at least a portion of said control means to thereby change the relative position of said tiltable parts to limit the power transmitted by said transmission and means preventing operation of said fluid motor under the influence of the fluid pressure of said transmission until the fluid pressure of said transmission exceeds a predetermined pressure.

2. A power transmission mechanism as set forth in claim 1 further including valve means for at least partially controlling the communication of fluid pressure from said transmission to said fluid motor as a function of a condition indicating an impending stalling of a prime mover for driving said pump means to thereby reduce the power demand of said transmission and to prevent a stalling of the prime mover by operating said fluid motor to change the relative position of said tiltable parts.

3. A power transmission mechanism as set forth in claim 1 wherein said fluid motor includes a cylinder, and a piston slidably mounted in said cylinder, and said means preventing operation of said fluid motor includes a spring means for biasing said piston against movement toward one end portion of said cylinder, said means for communicating the fluid pressure of said transmission to said fluid motor being connected in fluid communication with an end portion of said cylinder opposite from said one end portion to move said piston against the influence of said spring means to thereby effect the aforesaid operation of at least a portion of said control means.

4. A power transmission mechanism as set forth in claim 1 wherein said control means includes a selectively movable control lever, a valve operatively connected with said control lever and responsive to movement of said control lever, linkage means operatively connected to one of said tiltable parts, and fluid operated means for operating said linkage means in response to operation of said valve by said control lever to change the relative positions of said tiltable parts, said fluid motor being operable under the influence of fluid pressure from said transmission to also operate said linkage means to thereby change the relative position of said tiltable parts.

5. A power transmission mechanism comprising pump means for providing fluid under pressure and having a tiltable part, motor means operated by the fluid pressure output of said pump means and having a tiltable part, means providing for fluid communication between said pump means and said motor means, the relative positions of said tiltable parts determining the drive ratio of said transmission, control means for selectively adjusting the relative positions of said tiltable parts to thereby vary the drive ratio of said transmission, and means for controlling the relative positions of said tiltable parts in response to predetermined conditions of operation to limit the power transmitted by said transmission, said means for controlling the relative positions of said tiltable parts including a fluid servomotor means having a first area exposed to the fluid pressure of said pump means and said motor means to effect operation of said fluid servomotor means in response to the fluid pressure of said transmission exceeding a predetermined pressure to operate at least a portion of said control means to thereby change the relative positions of said tiltable parts to limit the power transmitted by said transmission, and anti-stall means including valve means for exposing a second area of said fluid servomotor means to the fluid pressure of said pump means and said motor means in response to a condition indicating an impending stalling of a prime mover for driving said pump means to thereby prevent stalling of the prime mover by operating said control means to change the relative positions of said tiltable parts and reduce the power demand of said transmission.

6. A power transmission mechanism as set forth in claim 5 wherein said anti-stall means is connected in fluid communication with said means for providing fluid communication between said pump means and said motor means.

7. A power transmission mechanism as set forth in claim 6 wherein said fluid servomotor means includes a reciprocatable member, said first and second areas being formed on said reciprocatable member.

8. A power transmission mechanism as set forth in claim 5 wherein said control means includes a fluid operated control motor connected to one of said tiltable parts for varying the relative positions of said tiltable parts, valve means for controlling a flow of fluid from a source of fluid under pressure to said control motor, and linkage means connected to said control motor and said valve means, said linkage means being selectively operable between a first condition in which said valve means is operated to an open position connecting said control motor in communication with said source of fluid under pressure and a second condition in which said valve means is operated to a closed position blocking a flow of fluid from said source of fluid under pressure to said control motor, said first condition of said linkage means being associated with a selected drive ratio between said pump means and said motor means, said control motor being responsive to operation of said valve means to said open position by said linkage means to move said pump and motor means to relative positions corresponding to the selected drive ratio, said linkage means being operated to said second condition in response to movement of said pump and motor means to the relative positions corresponding to the selected drive ratio to thereby operate said valve means to said closed position and block the flow of fluid to said control motor to maintain said pump and motor means in the relative positions corresponding to the selected drive ratio.

9. A power transmission mechanism comprising pump means for producing fluid under pressure and having a tiltable part, motor means operated by the fluid pressure output of said pump means and having a tiltable part, means providing for fluid communication between said pump means and said motor means, the relative positions of said tiltable parts of said pump means and said motor means determining the drive ratio therebetween, actuator means operatively connected to said tiltable parts and operable to move said tiltable parts into various relative positions to vary the drive ratio of said transmission, overriding control means operable to change the relative positions of said tiltable parts established by said actuator means in response to a power condition of said transmission, said overriding control means including a reciprocable member operable to change the positions of said tiltable parts upon movement in one direction and power means for moving said member in said one direction in response to said power condition of said transmission, said power means including a fluid servomotor means and said overriding control means further includes spring means for biasing said reciprocable member in another direction opposite said one direction, means communicating the fluid pressure of said transmission with said servomotor means to direct said fluid pressure to act on a primary pressure area of said reciprocable member, and selectively operable valve means including a valve member settable to direct said fluid pressure against a spaced secondary pressure area of said reciprocable member to effect movement of said reciprocable member when the fluid pressure acting against said primary area only would not overcome the force of said spring means and when a stall condition is being approached.

10. A power transmission mechanism for transmitting torque from an input shaft to an output shaft comprising pump means driven by said input shaft and including a tiltable head operated by fluid pressure and operatively connected to drive said output shaft, the position of said tiltable head relative to said input shaft determining the drive ratio between said input and output shafts, actuator means operatively connected to said pump head to tilt said head and thereby change the position thereof relative to said input shaft and control means operatively connected to said tiltable head to change the position thereof and provide a reduced drive ratio between said shafts when the torque delivered to said pump means by said input shaft reaches a predetermined magnitude, said control means including a cylinder and a piston rod reciprocable relative to said cylinder, means for communicating the fluid pressure of said transmission to said cylinder whereby when said fluid pressure exceeds a predetermined pressure the piston rod is moved to effect movement of the tiltable head into a different position, and spring means for biasing said piston rod against movement by said pressure and which is overcome at a predetermined pressure, said spring means including first and second spring members, means positioning said first spring member to directly engage a portion of said piston rod and means positioning said second spring member to be initially out of engagement with said piston rod and said fluid pressure must first overcome the force exerted by said first spring member to move said piston rod a first extent to bring said piston rod into engagement with said second spring member and to effect continued movement of said piston rod the fluid pressure must overcome the combined force of said first and second spring members.

11. A power transmission mechanism for transmitting torque from an input shaft driven by drive means to an output shaft comprising pump means driven by said input shaft and operable to produce fluid under pressure and having a tiltable part, motor means drivingly connected to said output shaft and operated by the fluid pressure output of said pump means and having a tiltable part, means providing for fluid communication between said pump means and said motor means, the relative positions of said tiltable parts of said pump means and said motor means determining the drive ratio between said shafts, actuator means operatively connected to said tiltable parts and operable to move said tiltable parts into various relative positions to vary the drive ratio of said transmission, and anti-stall control means operable to change the relative positions of said tiltable parts and provide a reduced drive ratio between said shafts when said drive means is approaching a stall condition, said anti-stall control means including a fluid servomotor having a piston rod and operable to effect movement of said tiltable parts, means communicating the fluid pressure of said transmission to said fluid motor, and valve means for controlling the application of said fluid pressure to said piston rod including a valve member movable in response to said drive means approaching a condition of stall to increase the force applied by said fluid pressure to said piston rod to effect movement of said piston rod to establish a lower drive ratio in said transmission, said piston rod including first and second spaced pressure areas and said valve means includes means providing a fluid passageway between said first and second pressure areas and said valve member cooperating with said passageway to establish fluid flow therethrough when said drive means is approaching said stall condition.

12. A power transmission mechanism for transmitting torque from an input shaft driven by drive means to an output shaft comprising pump means driven by said input shaft and operable to produce fluid under pressure and having a tiltable part, motor means drivingly connected to said output shaft and operated by the fluid pressure output of said pump means and having a tiltable part, means providing for fluid communication between said pump means and said motor means, the relative positions of said tiltable parts of said pump means and said motor means determining the drive ratio between said shafts, actuator means operatively connected to said tiltable parts and operable to move said tiltable parts into various relative positions to vary the drive ratio of said transmission, and anti-stall control means operable to change the relative positions of said tiltable parts and provide a reduced drive ratio between said shafts when said drive means is approaching a stall condition, said anti-stall control means including a fluid servomotor having a piston rod and operable to effect movement of said tiltable parts, means communicating the fluid pressure of said transmission to said fluid motor, and valve means for controlling the application of said fluid pressure to said piston rod including a valve member movable in response to said drive means approaching a condition of stall to increase the force applied by said fluid pressure to said piston rod to effect movement of said piston rod to establish a lower drive ratio in said transmission.

13. A power transmission mechanism as defined in claim 9 wherein said valve means further includes means defining a fluid passageway between said primary and said secondary pressure areas and said valve member cooperating with said passageway to selectively establish and interrupt flow through said passageway.

References Cited

UNITED STATES PATENTS

| | | |
|---|---|---|
| 3,173,243 | 3/1965 | Reinke. |
| 3,186,170 | 6/1965 | Gauthier et al. _____ 60—53 |
| 3,371,479 | 3/1968 | Yapp et al. _____ 60—19 |

EDGAR W. GEOGHEGAN, *Primary Examiner.*

U.S. Cl. X.R.

60—19; 180—66